United States Patent Office 3,113,636
Patented Dec. 10, 1963

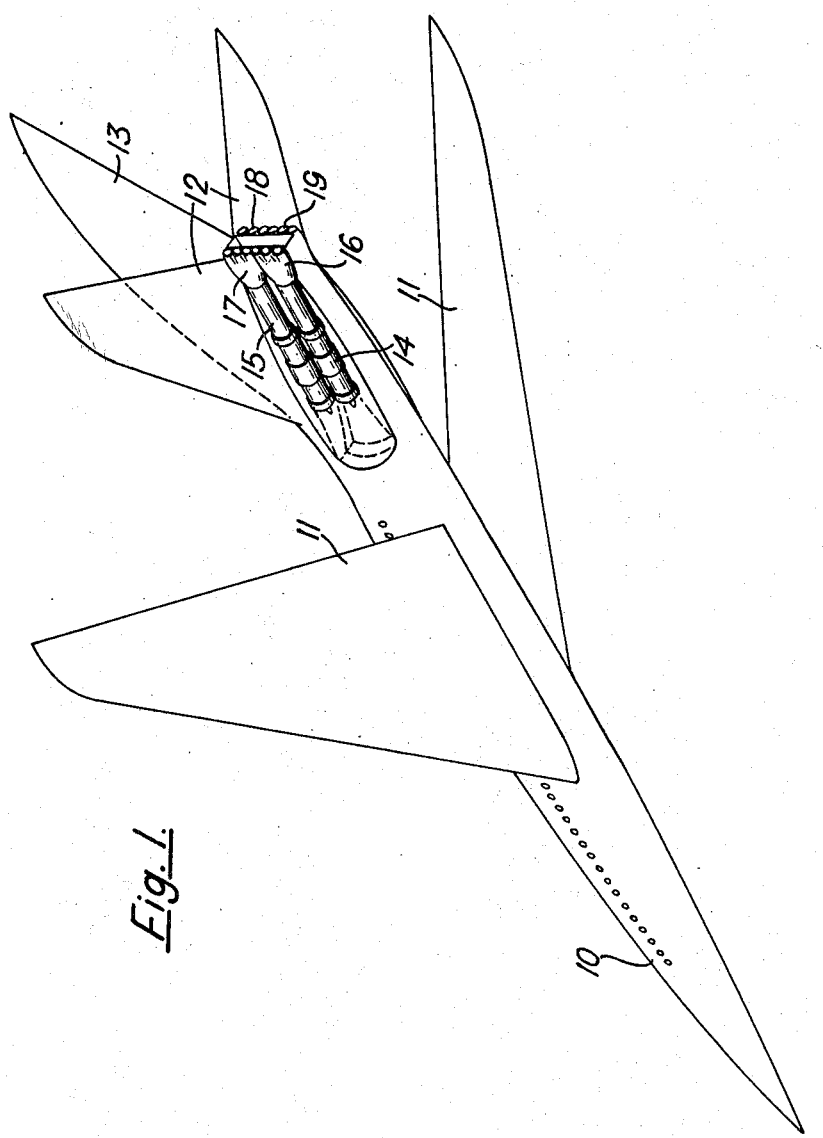

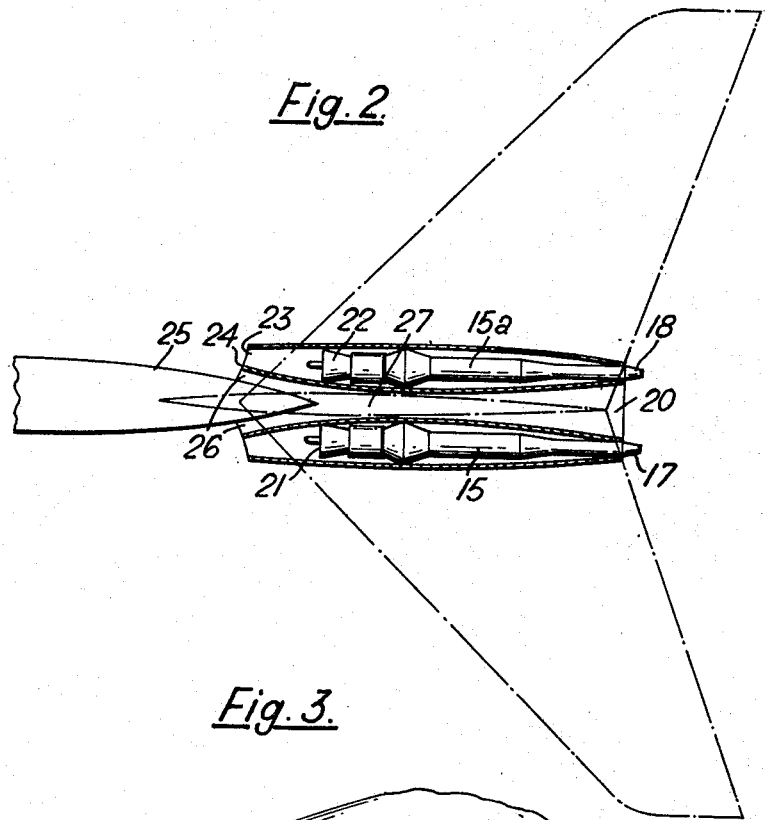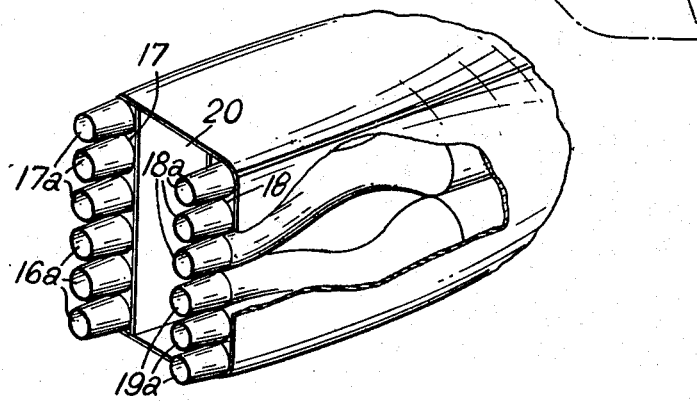

3,113,636
JET NOISE SILENCING APPARATUS FOR AN AIRCRAFT
David Morris Brown, Alvaston, Derby, and Hubert Spooner, Bramcote, Nottingham, England, assignors to Rolls-Royce Limited, Derby, England
Filed Oct. 7, 1960, Ser. No. 61,275
Claims priority, application Great Britain Oct. 9, 1959
3 Claims. (Cl. 181—43)

This invention relates to jet noise silencing apparatus for an aircraft.

According to the present invention there is provided a jet noise silencing apparatus for an aircraft comprising at least one pair of transversely spaced jet noise silencers, each silencer comprising a row of jet nozzles which are in substantial alignment with each other, whereby the said apparatus may be arranged on an aircraft with the said rows vertically disposed and horizontally spaced from each other in relation to the horizontal plane of the aircraft.

When the said rows are so vertically disposed then, at a point immediately below the aircraft, the jet from the lowest nozzle masks, to some extent, the noise emitted by the jets issuing from the nozzles disposed vertically above it.

Preferably the silencers of each pair are spaced by a duct through which air may flow during operation of the aircraft.

The invention also comprises an aircraft provided with the said jet noise silencing apparatus and this aircraft preferably comprises means for ensuring a flow of air through said duct.

Preferably the said flow of air comprises a bleed of aircraft boundary layer air.

The pairs of silencers are preferably disposed at the rear end of the aircraft fuselage, the boundary layer air being bled from the part of the fuselage of the aircraft ahead of or adjacent to the air inlet to gas turbine engines provided with said silencers.

The maintenance of a supply of air to the duct between the pairs of silencers increases the effectiveness of the silencers. Moreover the boundary layer air, which, as stated above, may be bled from the fuselage ahead of the air inlet to the engines so as to increase intake ram efficiency, is finally disposed of by rearward rather than by sideways ejection so as to give the least momentum drag.

In the case of an aircraft provided with the said jet noise silencing apparatus, the large nozzle constituted by the said pair of silencers and by the said duct between them, considerably reduces the effective base area of the rear fuselage of the aircraft and consequently its base drag.

One embodiment of the invention is described below, merely by way of example, with reference to the accompanying drawings, in which:

FIGURE 1 is a perspective view of an aircraft with the rear portion of its fuselage broken away to show a jet noise silencing apparatus according to the invention;

FIGURE 2 is a plan of the tail end of the aircraft showing the ducts in which the aircraft engines are mounted, in section, and showing the tail plane and fin of the aircraft in chain dotted lines; and FIGURE 3 is an enlarged perspective view of the rear end of the fuselage of the aircraft with a portion broken away to show the silencing apparatus in more detail.

In FIGURE 1 is shown a swept wing aircraft 10 having a wing 11, a tail plane 12 and a tail fin 13. The aircraft is propelled by four gas turbine engines, two of which are shown at 14 and 15. The engines 14, 15 have silencers 16, 17 respectively and the other two engines have silencers 18, 19 respectively.

As shown in FIGURE 3, each silencer comprises a row of three nozzles which are vertically aligned with respect to the horizontal plane of the aircraft. The nozzles for silencer 16 are designated 16a, and those for silencers 17, 18 and 19 are designated respectively 17a, 18a and 19a.

The silencers 17 and 18, for example, form a pair which are laterally spaced and have between them a duct 20. Equally, the silencers 16, 19 also form a pair which are transversely spaced by the duct 20. Through the duct 20 a supply of air is maintained during the operation of the aircraft.

In FIGURE 2 two engines 15 and 15a are shown which have air intakes 21, 22 respectively.

Intake 22 is connected by a duct 23 with the atmosphere just forward of the tail plane 12.

A wall 24 divides the duct 23 from the rear portion of the fuselage 25.

The space between the fuselage 25 and the wall 24 forms a duct 26 for bleeding the aircraft boundary layer air from the rear end of the fuselage 25.

There are two ducts 26, one for each of engines 15 and 15a. The ducts 26 are united to form a common duct 27 which leads to the outlet duct 20 between the two pairs of silencers at the rear end.

This boundary layer air passes through the ducts 26, 27 and 20 and provides a constant supply of air during operation of the aircraft to increase the effectiveness of the silencers 16, 17, 18 and 19.

Boundary layer bleed from the exterior fabric of high speed aircraft fuselages is very important to achieve aerodynamic efficiency of the aircraft.

This boundary layer bleed air is normally wasted, but by making use of the invention the air can be employed to increase the effectiveness of the silencing by virtue of the mixing which occurs between the jet gases and the boundary layer bleed air.

It will be appreciated that when the nozzles of the silencers 16–19 are vertically arranged then, at a point immediately below the aircraft, the jet from the lowest nozzle masks, to some extent, the noise emitted by the jets issuing from the nozzles disposed vertically above it.

We claim:

1. An aircraft having a fuselage, at least one gas turbine engine, jet noise silencing apparatus disposed at the rear end of the fuselage, said jet noise silencing apparatus discharging exhaust gases from said at least one engine and comprising at least one pair of horizontally spaced silencers, each of said silencers comprising a row of vertically aligned jet nozzles, a duct disposed between said silencers and having air intake means opening on said fuselage adjacent the rear end thereof for receiving boundary air progressing along the same, said duct and said nozzles terminating in substantially the same transverse plane of the fuselage so that jets issuing from the rows of vertical nozzles are separated by a relatively dense and slow moving stream of fuselage boundary layer air.

2. An aircraft having a fuselage, at least two gas turbine engines horizontally spaced from one another on each side of the rear end of the fuselage, jet noise silencing apparatus disposed at the rear end of the fuselage, said jet noise silencing apparatus discharging exhaust gases from said engines and comprising at least one pair of horizontally spaced silencers, each of said silencers comprising a row of vertically aligned jet nozzles, one row of jet nozzles being associated with one of said engines and the other row being associated with the other of said engines, a duct disposed between said silencers, duct air intake means communicating with said duct and open to boundary layer air progressing along the fuselage adjacent the rear end thereof, engine air intake means opening to ambient air at a location which is rearward relative to where said duct intake means opens to boundary layer air, said duct and said nozzles terminating in substantially the same transverse plane of the fuselage so that jets issuing from the rows of vertical nozzles are separated by a relatively dense slow moving stream of fuselage layer boundary air.

3. An aircraft having a fuselage, at least two gas turbine engines horizontally spaced from one another on each side of the rear end of the fuselage, jet noise silencing apparatus disposed at the rear end of the fuselage, said jet noise silencing apparatus discharging exhaust gases from said engines and comprising at least one pair of horizontally spaced silencers, each of said silencers comprising a row of vertically aligned jet nozzles, one row of jet nozzles being associated with one of said engines and the other row being associated with the other of said engines, a duct disposed between said silencers, duct air intake means communicating with said duct and open to boundary layer air progressing along the fuselage adjacent the rear end thereof, engine air intake means disposed outwardly of said duct air intake means relative to the fuselage and opening and ambient air in substantially the same transverse plane of the fuselage as where said duct air intake means opens to boundary layer air, said duct and said nozzles terminating in substantially the same transverse plane of the fuselage so that jets issuing from the rows of vertical nozzles are separated by a relatively dense slow moving stream of fuselage layer boundary air.

References Cited in the file of this patent

UNITED STATES PATENTS

| | | |
|---|---|---|
| 2,335,134 | Sands | Nov. 23, 1943 |
| 2,395,919 | Sundell | Mar. 5, 1946 |
| 2,633,703 | Tenney et al. | Apr. 7, 1953 |
| 2,650,752 | Hoadley | Sept. 1, 1953 |
| 2,840,325 | Griffith | June 24, 1958 |
| 2,973,825 | Bertin | Mar. 7, 1961 |
| 2,988,302 | Smith | June 13, 1961 |
| 3,025,667 | Moorehead | Mar. 20, 1962 |

FOREIGN PATENTS

| | | |
|---|---|---|
| 744,196 | Great Britain | Feb. 1, 1956 |

OTHER REFERENCES

SAE Journal, August 1959, pages 82–84, "Rectangular Nozzles Cut Jet Ground Noise," by J. M. Tyler et al.